United States Patent [19]

Hardesty, Jr. et al.

[11] 3,910,322

[45] Oct. 7, 1975

[54] TEST SET CONTROLLED BY A REMOTELY POSITIONED DIGITAL COMPUTER

[75] Inventors: Samuel J. Hardesty, Jr., Linthicum; Harvey M. Masters, Ellicott City, both of Md.

[73] Assignee: Westinghouse Electric Corporation, Pittsburgh, Pa.

[22] Filed: Aug. 24, 1972

[21] Appl. No.: 283,452

[52] U.S. Cl. .................... 340/172.5; 340/146.1 BA

[51] Int. Cl.$^2$. H04L 1/00; G08C 25/02; H03K 5/18; H03K 13/32

[58] Field of Search ....... 340/172.5, 146.1 BA, 152; 179/15 AL, 2 DP, 15 AE; 235/153 AC

[56] References Cited

UNITED STATES PATENTS

| | | | |
|---|---|---|---|
| 3,228,000 | 1/1966 | Collis | 340/146.1 |
| 3,336,576 | 8/1967 | Sourgens | 340/146.1 |
| 3,350,687 | 10/1967 | Gabrielson | 340/163 |
| 3,388,378 | 6/1968 | Steeneck et al. | 340/146.1 |
| 3,402,389 | 9/1968 | Koontz | 340/146.1 |
| 3,403,382 | 9/1968 | Frielinghaus et al. | 340/172.5 |
| 3,452,330 | 6/1969 | Avery | 340/172.5 |
| 3,454,936 | 7/1969 | Bridge | 340/172.5 |
| 3,456,239 | 7/1969 | Glasson | 340/146.1 |
| 3,473,150 | 10/1969 | McClelland | 340/163 |
| 3,541,513 | 11/1970 | Paterson | 340/151 |
| 3,564,511 | 2/1971 | Restivo et al. | 340/172.5 |
| 3,582,904 | 6/1971 | Brandwein | 340/172.5 |
| 3,588,834 | 6/1971 | Pedersen | 340/172.5 |
| 3,629,859 | 12/1971 | Copland et al. | 340/172.5 |
| 3,647,972 | 3/1972 | Glover et al. | 179/2 DP |
| 3,648,256 | 3/1972 | Paine et al. | 340/172.5 |
| 3,654,620 | 4/1972 | Bartocci | 340/172.5 |
| 3,680,045 | 7/1972 | Meidan | 340/146.1 BA |
| 3,700,814 | 10/1972 | Spraker | 179/2 |
| 3,760,362 | 9/1973 | Copland | 340/172.5 |

*Primary Examiner*—Gareth D. Shaw
*Assistant Examiner*—James D. Thomas
*Attorney, Agent, or Firm*—J. B. Hinson

[57] ABSTRACT

A test facility which utilizes a digital computer to control and analyze the results of tests on equipment which is remotely positioned from the computer is disclosed. The equipment to be tested is interfaced with a simple portable test set which is positioned at the equipment to be tested. The computer and the portable data set are interfaced with a conventional telephone network. Digital data words specifying the test to be performed are transferred from the computer to the portable test set via the telephone network. Digital data words indicative of the responses of the equipment being tested are transferred from the portable test set to the computer. These data words are analyzed by the computer to determine the operability of the equipment. Signals indicative of the condition of the equipment are sent from the computer system to the remote facility. All the data transmitted via the telephone network is checked for accuracy by retransmitting the data to the point of origin and comparing it, bit by bit, to the data as transmitted. Any data found to contain errors is retransmitted.

4 Claims, 12 Drawing Figures

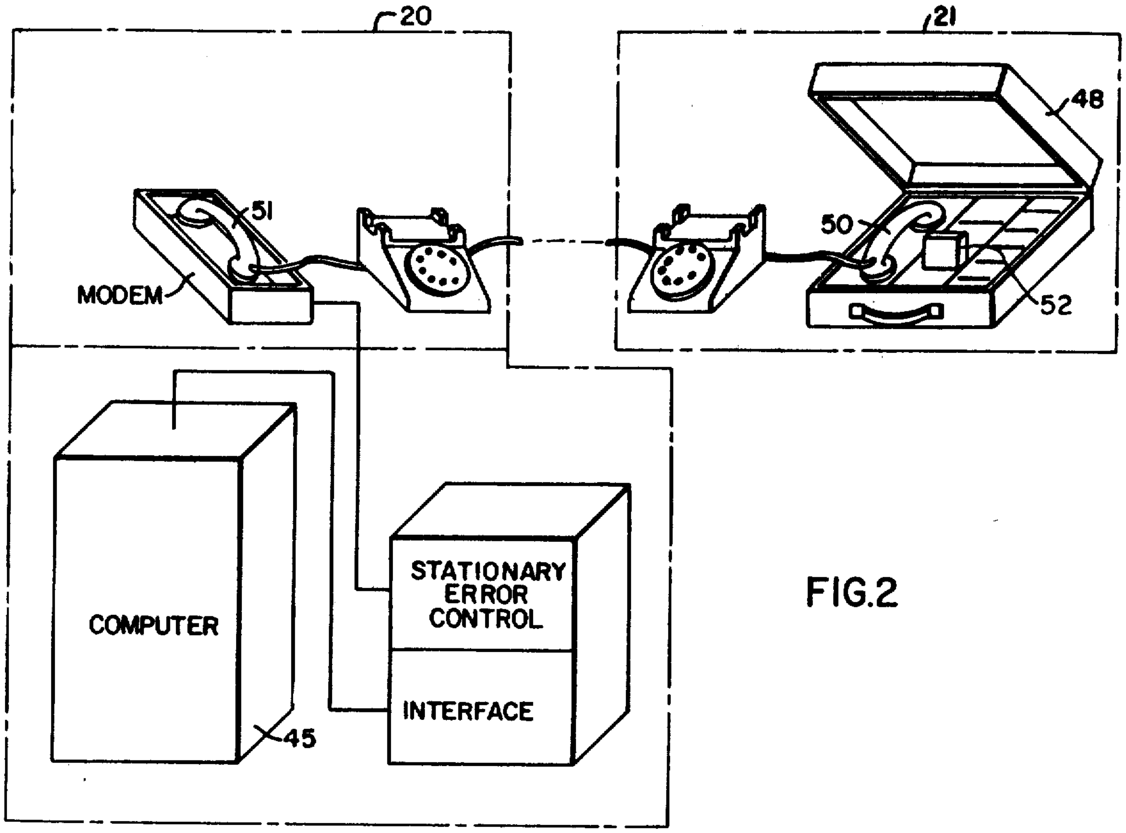
FIG. 2
FIG. 5A
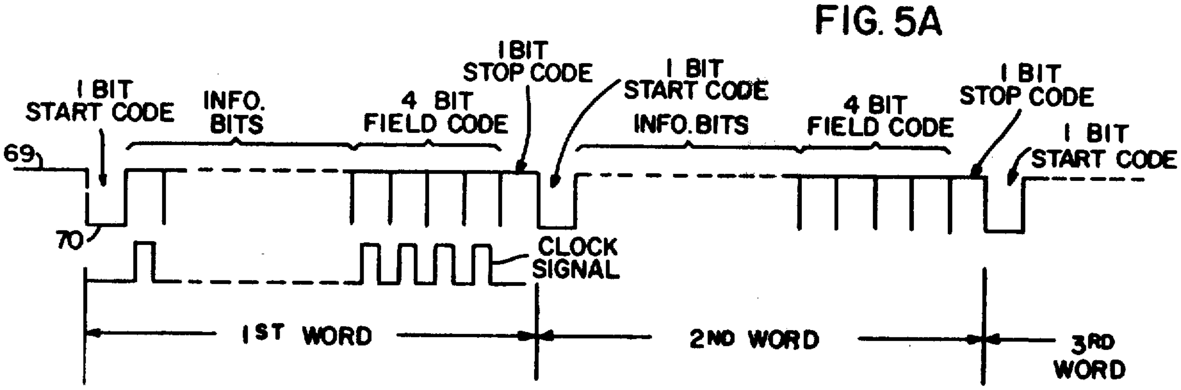
| FIELD CODE | BIT 1 | BIT 2 | BIT 3 | BIT 4 |
|---|---|---|---|---|
| 1 | 1 | 1 | 0 | 0 |
| 2 | 0 | 1 | 0 | 1 |
| 3 | 1 | 0 | 1 | 1 |
| 4 | 0 | 0 | 1 | 0 |
FIG. 5B FIG. 3
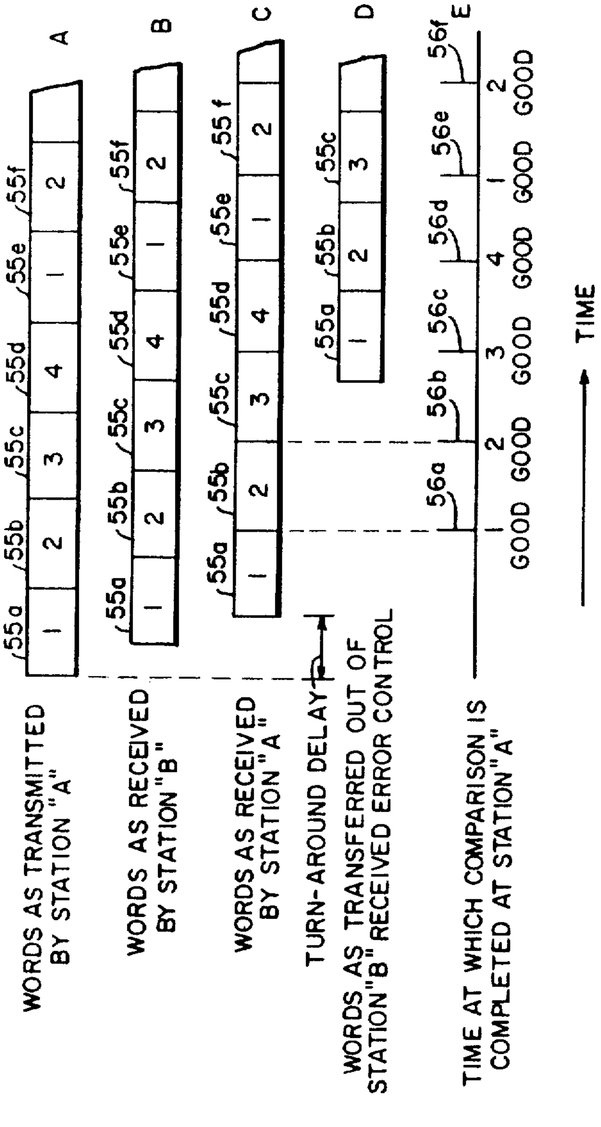
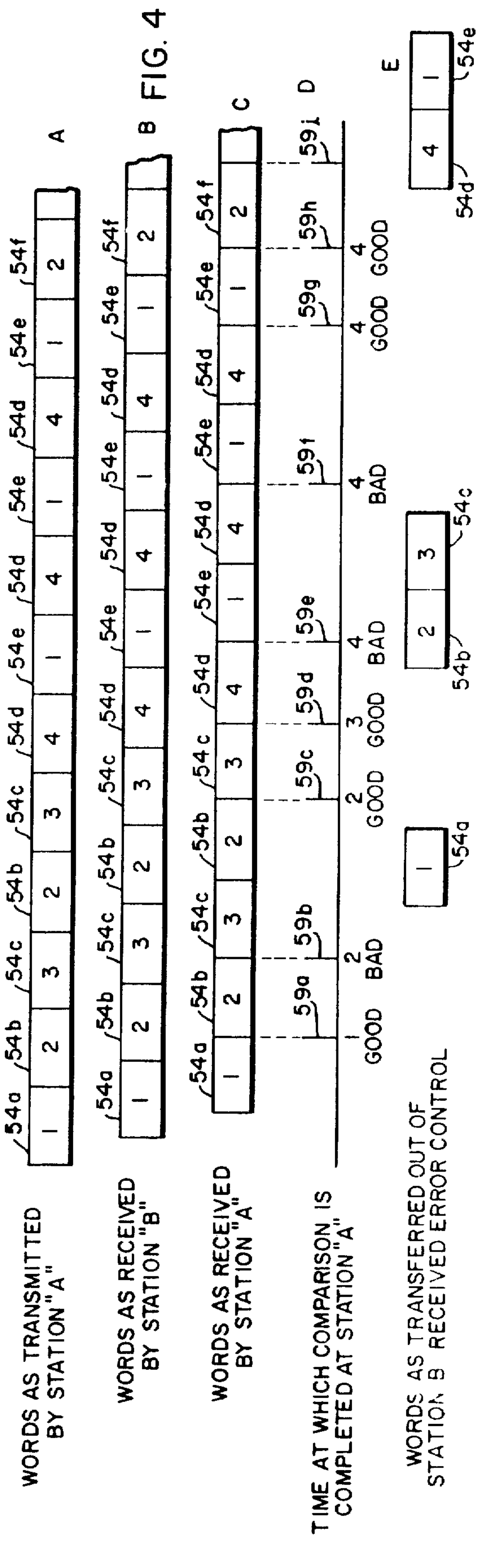

TEST SET CONTROLLED BY A REMOTELY POSITIONED DIGITAL COMPUTER

BACKGROUND OF THE INVENTION

1. Field of the Invention

The invention relates to test systems and more particularly to test systems utilizing a digital computer to control a remotely positioned test set.

2. Description of the Prior Art

Prior art computer controlled test sets have generally been limited to testing equipment which is located in the vicinity of the computer. This has been true primarily because of the difficulty of accurately transmitting data between the computer and the test set.

Many prior art techniques have been used to transmit data between two points with a high probability that errors introduced during the transmission were detected and corrected. These methods generally transmit blocks of words during a single transmitting cycle. These blocks may contain hundreds or thousands of bits of information.

One prior art method utilized large blocks of data with each block containing multiple digital data word and redundant data. Equipment was provided at the receiving end to check and correct any errors detected. The corrections made were based on an examination of the redundant data. One disadvantage of such a system is the fact that the error correction is limited and can completely fail when large numbers of errors are produced. Such a system is not suitable for operation in an environment characterized by impulse noise such as the public telephone network. Alternatively in some prior art systems transmission ceases after the block of data is sent. The transmitter waits for a signal from the receiver indicating the status of the block of data it has received. If an error is detected at the receiver the transmitter is notified and the entire original block of data is retransmitted. If no errors are detected the next block is transmitted. In either case the transmitter is required to contain relatively complicated encoding equipment and the receiver must include relatively complex error detection circuits. Both transmitter and receiver must contain large memories to store at least one block of data. These features add considerably to the cost and complexity of the system. The transmission efficiency is very low in cases where the message contains less than a few hundred bits of information.

The above-discussed features of prior art systems made the implementation of truly portable computer controlled test sets difficult. These problems are substantially overcome by the disclosed system.

SUMMARY OF THE INVENTION

The above disadvantages of prior art test systems are substantially overcome by the disclosed system. In the disclosed test system each digital data word transferred, to the remotely positioned portable test set or from the portable test set to the computer facility includes a field code related to the sequence in which the data words are taken from the data source. Each of the data words are detected, temporarily stored and retransmitted by the receiving system. The data words as retransmitted are compared at the transmitter to the data word as transmitted to detect any errors which may have occurred in the transmission process. When an error is detected the transmission sequence is repeated beginning with the word containing the error. The unique arrangement of the field codes permits the receiver to determine which words have been verified at the transmitter.

In the preferred embodiment of the invention, data is transferred between the computer facility and the remote test set via a conventional telephone network. A full duplex transmission channel is used to implement the error detection and correction. Commercially available modems provide this capability.

In the disclosed system, digital data words specifying the test to be performed are sent from the computer facility to the portable test set. The portable test set decodes these words, if required, and generates input signals to the equipment to be tested. Signals indicative of the responses of the equipment being tested to these tests are sampled by the portable test set to generate digital signals indicative of the performance of the equipment being tested. These digital signals are transmitted to the computer facility where they are analyzed by the digital computer to determine the condition of the equipment being tested. This analysis may result in a simple go-no-go signal or may identify specific malfunctioning components within the equipment being tested. The extent to which a fault can be analyzed depends on the number of input signals generated by the portable test set and the number of test points available.

An important advantage of the disclosed system is the capability of detecting errors involving any number of bits within an individual data word or errors in any number of adjacent or non-adjacent data words. Such corrections were limited with systems utilizing redundant data because if many data words were lost as is common with signals transmitted over telephone networks the error correction capability is totally lost.

The disclosed system also reduces the size and complexity of the remote test set making a truly portable test set practical.

DESCRIPTION OF THE DRAWINGS

FIG. 2 is a block diagram of a test system which is the subject of this invention;

FIG. 3 is a diagram showing the time relationships between the transmission, checking and outputting of the data words;

FIG. 4 is a diagram illustrating the same relationships as in FIG. 3 when errors are detected;

FIG. 5A illustrates the bit structure of the transmitted words;

FIG. 5B is an example of a choice of field code patterns;

DETAILED DESCRIPTION

Figure 1:
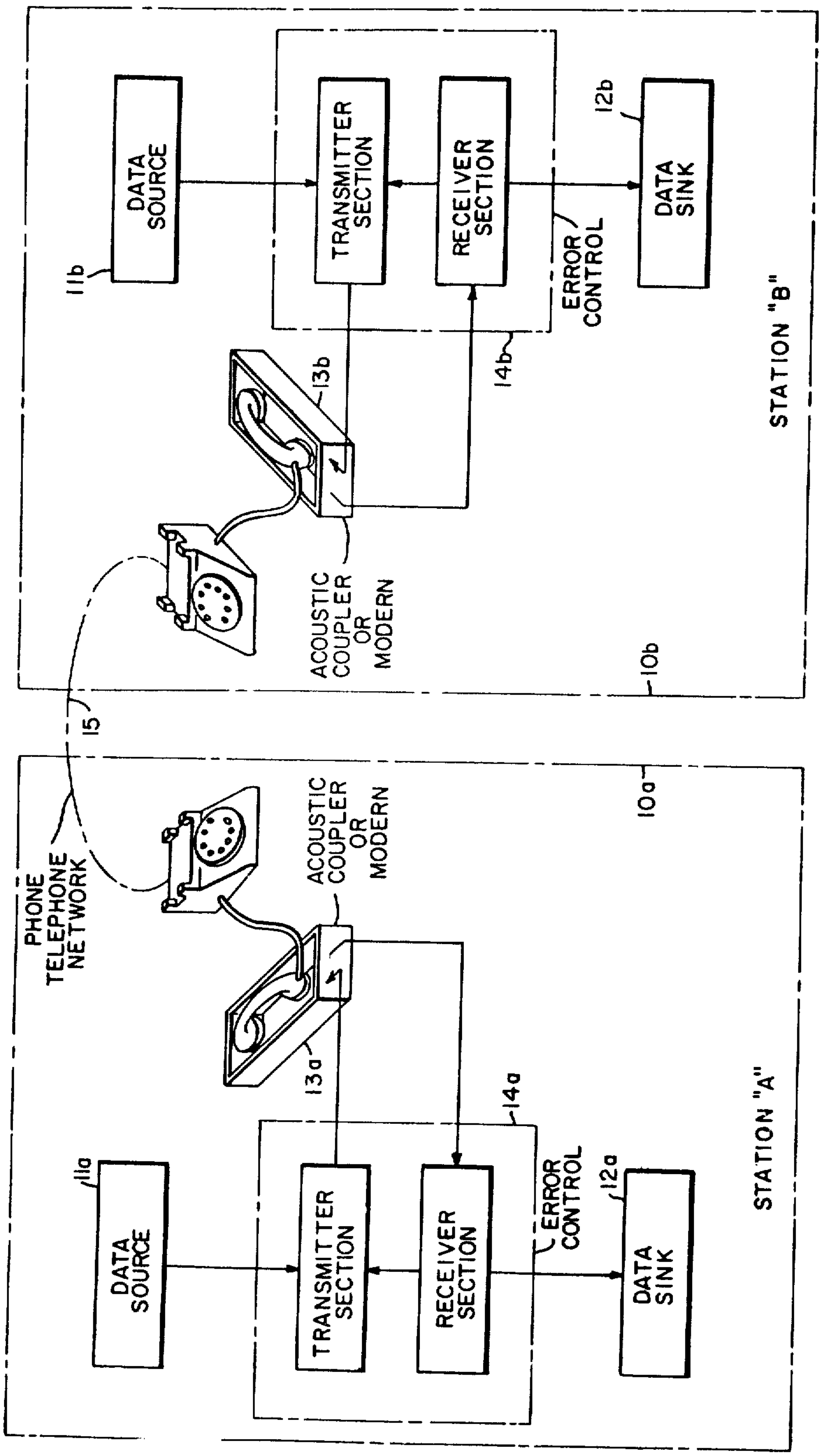
FIG. 1 is a block diagram of the error control system utilized by the test set interconnected with a conventional telephone network.

FIG. 1 illustrates an error-control system with the standard telephone network. This system is utilized by the disclosed test facility.

Two identical stations, A and B illustrated at reference numerals 10A and 10B, exchange digital data with one another. Either station, A or B, may choose to transmit while the other station receives. Each station has some device, or group of devices, which generate the data to be transmitted, referred to as the "data source." These data sources are illustrated at reference numerals 11*a* and 11*b*. Also, each station has some device, or group of devices, which receive the transmitted data, called the "data sink," illustrated at reference numerals 12*a* and 12*b*.

Each station also has a modem or acoustic coupler illustrated at reference numerals 13*a* and 13*b*. These modems convert input digital information to analog signals suitable for transmission over the telephone network, and analog signals from the telephone network to digital information. Acoustic couplers are preferred for the test set because they perform the same functions as modems, without required a hard-wired connection to the telephone lines. Information is coupled to the acoustic coupler through the transmitter and receiver of the telephone hand set. A modem or an acoustic coupler may be used at either station. Modems and acoustic couplers are readily available items well known in the industry.

The error-control device at station A is identical to the one at station B. These devices are illustrated at reference numerals 14*a* and 14*b*. Each of the error-control devices 14*a* and 14*b* consists of a transmitter and a receiver. When inactive, that is, when the two stations are not communicating, both of the error-control devices 14*a* and 14*b* are in the receive mode. Whenever one station wishes to send information to the other station, contact is established between the two telephones to be used and the error-control device of the sending station is switched to the transmit mode.

For example, assume station A 10*a* is to transmit information to station B 10*b*. The process begins with a "Begin Transmit" command, generated by the data source 11*a* of station A, which causes the station A error control 14*a* to switch to the transmit mode. The first word to be sent is transferred from the data source 11*a* to the error control transmitter where it is temporarily stored and then transferred to the acoustic coupler 13*a* for transmission over the telephone network 15. The word is received by the acoustic coupler 13*b* at station B and transferred to the error control receiver where it is temporarily stored to await verification by the comparator circuit in the station A transmitter. As the word is received by the station B error-control receiver, it is simultaneously returned to the send input of the station B acoustic coupler 13*b* for retransmission to station A. Because the two acoustic couplers 13*a* and 13*b* are operating in the full-duplex mode, the word is being returned to station A at the same time it is being received at station B. At station A, the word is being transmitted and received simultaneously, with the returned word being delayed by an amount required for it to make the round trip between the stations.

A comparator circuit in the station A transmitter compares the returned word bit-by-bit as it is received in the transmitter section with the previously stored original word. Because of the previously mentioned delay in receiving the returned word, the transmission of the first word from Station A is completed before the word is completely returned, and consequently, before the comparison is completed. However, station A does not wait for the comparison to be completed; instead, the error-control transmitter takes the second word of the message from the data source 11*a*, stores it temporarily, and transmits it to station B. While the second word is being transmitted by station A, the comparison of the first word is completed. Station A error-control transmitter then knows what its next actions will be. If the comparison indicates both words were identical, station A transmitter will take the third word of the message from the data source 11*a* and send it to station B when the transmission of the second word is completed. If however, the comparison indicated a difference in the two words, station A, upon completing the transmission of the second word, will transfer the first word from the error-control transmitter storage and retransmit it to station B. This will be followed by a retransmission of the second word, also transferred from the station A transmitter storage. The process continues until the words are favorably compared, at which time new words are taken from the data source 11*a* and transmitted to station B. Station B always returns the words as they are received.

The error-control transmitter assigns a field code of four bits to each word transmitted. The error-control receiver at station B is able to determine, by inspection of the field codes it receives, which words the station A transmitter has compared and found to be transmitted error free. It is able to do this without any exchange of information of any kind with the station A transmitter. Because of this feature, transmission from station A to station B is never interrupted. Information is constantly and continually transmitted, with no delays between transmitted words, even when errors are detected at the transmitter and retransmission of those words occur. Station A continues transmitting until all words of the message from the data source 11*a* have been transmitted and correctly compared.

The above-discussed procedure is reversed to transmit data from station B to station A.

A block diagram of the test system which is the subject of this invention is illustrated in FIG. 2. A permanently located computer facility 20 includes a computer 45 which controls the transmission of data from the facility 20 to the portable test set 21 and processes received data from a portable test set 21. The portable test set 21 can be utilized at any location accessible via a telephone network for purposes of testing circuit cards, for example. Commands from the computer 45 cause the portable test set 21 to apply predetermined input signals to the circuit under test and to sample signals at specified test points to generate digital data words. These data words are returned to the test facility 20 for analysis by the computer 45 and comparison with programmed values. When discrepancies are found, the computer transmits diagnostic information to the test set for use by the test set operator. This information may be a simple go-no-go signal or a more detailed analysis showing which component within the circuit is faulty. The detail to which analysis can be carried depends primarily on the number of test points.

In the preferred embodiment of the test system illustrated in FIG. 2, the primary function of the portable test set 21 is to generate test signals in response to digital data words received from the computer facility 20, couple these test signals to the circuit card under test 52, sample the output signals of the circuit card under test 52 and transmit digital signals indicative of these output signals to the computer facility 20. The computer facility 20 analyzes these digital signals to determine if the card under test 52 is functioning properly. The portable test set 21 may include analog-to-digital and digital-to-analog converters to sample analog signals and generate analog test signals.

From the above discussion, it is obvious that the types of test which can be performed depends only on the detailed design of the portable test set 21. The rate at which test can be performed depends, to a large extent, on the quantity of data to be transmitted from the computer facility 20 to the portable test set 21 and the rate at which this data is transferred. The quantity of data transferred can be reduced by making the remote facility 20 more complicated. The rate at which data can be transferred is determined primarily by the acoustic coupler.

The portable test set 21 also includes all the controls and displays necessary for the operator to determine the results of the test. The illustrated system includes a display (not shown) which notifies the operator whenever faults are detected by the computer facility. This display also informs the operator of the component which has failed. Testing starts automatically after the operator places his telephone handset in the test set acoustic coupler. After the test has started, data is alternately and automatically transferred between the facilities, as required, until the test is complete. When the test is complete, a signal is sent from the computer facility 20 to the portable test set 21 to energize the display to indicate that the test is complete.

The system can also be used to test other systems, for example, digital computers.

It should be emphasized that the error-correction system illustrated in FIG. 1 requires that the digital data words be transmitted from station A to station B and vice versa. The modems and error control systems must be capable of operating in this manner. However, the process of transmitting data and correcting errors is independent of the direction of transfer. Therefore only the transfer of data words from station A to station B will be described in detail.

In the preferred embodiment of the error-correction system data words are transmitted sequentially with no time delay between adjacent words. Each data word includes a field code whose function will be described in detail later. There are four distinct field codes which, for purposes of discussion, are assigned numbers 1 through 4. These field codes are sequentially assigned in ascending order to the words as they are taken from the data source. The relationship between field codes and data words, assuming no errors are made during transmission, is illustrated in FIGS. 3A through 3E. In FIG. 3A, each data word transmitted is represented by a rectangle with a number representing the field code assigned to the word positioned in that rectangle. For example, the first four words transmitted are assigned field codes 1 through 4 and are respectively illustrated at reference numerals *55a–55d*. The field codes are then repeated beginning with a field code of 1 for the fifth word transmitted as illustrated at reference numeral *55e*. The field codes are repeated in this sequence as many times as necessary to transmit the entire message. FIG. 3A further illustrates that each data word is serially transmitted with no time delay between adjacent words.

FIG. 3B illustrates the words shown in FIG. 3A as they arrive at the receiver having been delayed by the time required for them to be transmitted over the telephone network. The data words illustrated in FIG. 3B are identical to their respective counterparts illustrated in FIG. 3A provided no errors have been generated in the communication channel between transmitter and receiver. The data words illustrated in FIG. 3B are identified with the same reference numeral as used to identify the corresponding word in FIG. 3A in order to emphasize this identity.

The data words received at station B and illustrated in FIG. 3B are retransmitted bit by bit as they are received and returned to station A. The transmitted data words of FIG. 3A are shown in FIG. 3C as they return to station A. The delay time required for each word to make the round trip is labeled the "turnaround delay".

As the digital data words illustrated in FIG. 3A are transmitted from station A to station B, they are stored in a memory in the transmit error control (FIG. 1). However, no more than two words are ever stored at any given time. Additionally, the data words as received by station B, illustrated at reference numerals *55a* through *55f* of FIG. 3B, are retransmitted to station A. Each of the retransmitted words are shown in FIG. 3C, at reference numerals *55a* through *55f*, in the proper time relationship to the words previously discussed. As each of the words illustrated in FIG. 3C are received at station A, they are compared on a bit-by-bit basis to the original word transmitted and previously stored at station A. After each word has been compared to the original word as transmitted, a decision is made as to whether or not the words are alike and consequently properly received at station B. The times when these decisions are made are illustrated at reference numerals *56a* through *56f* of FIG. 3E. For example, a decision that the first word with a field code of 1 was properly transmitted is made at a point illustrated at reference numeral *56a* of FIG. 3E. Decisions that subsequently transmitted words were transmitted correctly are made at points *56b* through *56f*. That is, the decision is made when the last bit of the returned word is received at station A.

Since FIGS. 3A through 3E assumed that all data words were transmitted error free between station A and station B, the above-described transmission sequence continues until all words comprising the message have been transmitted.

The receiver error control at station B includes a memory for storing two data words, but not their associated field codes which are no longer needed once the words are stored. After a complete word has been received, the contents of one of these memories is outputted from the Error Control System and the newly received word is stored in that memory, provided the field codes are in the normal sequence. An abnormal field code sequence indicates that a transmission error has been made and that selected words are being retransmitted. The word sequences illustrated in FIGS. 3A through 3E assumes no transmission errors, with FIG. 3D illustrating the sequence and times at which these data words are transferred from the memories in the receive error control to the receiver output bus.

FIGS. 4A through 4E illustrate an example of sequences in which data words are transmitted from station A to station B when errors are introduced in the transmitting channel. As in the above discussion, each word transmitted is represented by a rectangle with a number representing the field code of the word positioned in that rectangle.

As previously discussed, each word transmitted is checked for errors, and, when an error is found, the transmission sequence is restarted beginning with the word which was improperly transmitted. Since the error checking method requires that each word received by station B be retransmitted to station A for comparison with the original word transmitted, there is necessarily some time difference between the transmission of a word and the checking of the accuracy of the transmission. That is, while a word with field code $n$ is being transmitted, returned word with field code $n-1$ is checked for accuracy. Consequently, even before the word with field code $n$ has been completely transmitted, the transmitter section decides which word is to be transmitted next.

FIGS. 4A through 4E, respectively illustrate the data words as transmitted by station A, the data words as received by station B, the returned data words as received by station A, the times at which decisions are made as to the accuracy with which specific data words were transmitted, and the data words as transferred out of the error control receiver to the receiver output bus. The same reference numeral is retained in FIGS. 4A through 4E to emphasize that the same data word is being illustrated with the different Figures indicating only different phases of the process.

In FIGS. 4A through 4E the sequential words of the message are identified by reference numerals 54*a* through 54*f*. When a word is retransmitted due to the detection of an error in the transmission thereof, the reference numeral is not changed. Examination of FIG. 4A shows that data words identified by reference numerals 54*b* through 54*e* are each retransmitted at least one time due to errors in transmission of these words.

The first data word of the message, illustrated at reference numeral 54*a* was correctly transmitted with the decision that this word was correctly transmitted being made at a point illustrated at reference numeral 59*a* of FIG. 4*d*. The transmission and receive cycle for this word is completed when it is outputted from the Error Control System as illustrated at reference numeral 54*a* of FIG. 4E.

The second word of the message, illustrated at reference numeral 54*b* is improperly transmitted due to an error being introduced into the communication channel. As previously discussed, this decision is made by comparing the returned word, illustrated at reference numeral 54*b* of FIG. 4C, with the originally transmitted data word. The time at which the decision is complete is illustrated at reference numeral 59*b*, FIG. 4D. Due to delays in the transmission channel, the decision that this data word was improperly transmitted was not made until the transmission of the following word of the message, illustrated at reference numeral 54*c*, of FIG. 4A has already started. For convenience the remainder of the third word of the message is transmitted, and then the second and third words of the message are retransmitted. On the second attempt, these words are properly transmitted with the points at which the decisions that these words were properly transmitted are made being respectively illustrated at reference numerals 59*c* and 59*d* of FIG. 4D. The sequence and time at which these words are transferred from the Error Control System to the output data bus is illustrated in FIG. 4E at reference numerals 54*b* and 54*c*.

For the purpose of further illustrating the error correction process, the fourth word of the message, first illustrated at reference numeral 54*d* of FIG. 4A will be assumed to be improperly transmitted on both the first and second attempts. The time at which decisions that this word was improperly transmitted on the first and the second attempts respectively illustrated at reference numerals 59*e* and 59*f* of FIG. 4D. Finally, a decision that this word was properly transmitted is made at a point illustrated at reference numeral 59*g* of FIG. 4D. Following the transmission of the fourth word of the message, subsequent words of the message are transmitted and the field codes begin to repeat. The first two of these subsequent words are illustrated at reference numerals 54*e* and 54*f* of FIG. 4A.

FIG. 5A illustrates the word format used in transmitting data in the above-described error correction system. Two complete data words are shown in order to clearly show the sequential nature of the data transmission.

When no data is being transmitted, the output signals from the acoustic couplers 13*a* and 13*b* of FIG. 1 to the error control circuit is at a high level as illustrated at reference numeral 69 of FIG. 5A. This signal is continuously monitored by the error-control receiver. When a start code is received, indicated by the output signal going low as shown at reference numeral 70, a clock is started to generate a signal having a pulse position such that it can be used to shift the bits of the data word into a shift register. Immediately following the start code 70, is a series of information bits. The number of information bits can be selected to fit the immediate application. (For example, 16 bits). Sequentially following the information bits is a four-bit field code, and a one-bit stop code. The stop code is by definition a bit which is always high. The stop code is necessary to assure that the following start code can be detected, because, by definition the start code is a signal generated when the received signal goes from a high to a low level. The details of the clock signal for one word are shown in FIG. 5A. Clock signals for previous and subsequent data words are similar to the clock signal illustrated in FIG. 5A.

Any number of field code combinations can be selected. One such choice is given in FIG. 5B. For purposes of this Figure, "1" and "0" are respectively used to represent the high and low levels of a two-level digital signal. Arrangements are chosen to make it unlikely for one valid field code to be changed, due to transmission errors, into a second valid field code. In the examples given in FIG. 5B, at least two and usually three bits must be changed to convert one code into another one. Although a field code of only four bits wide has been found satisfactory, additional bits in each field code would reduce the probability of conversion from one valid code to another. The function of the field codes will be subsequently described in detail.

Figure 6:
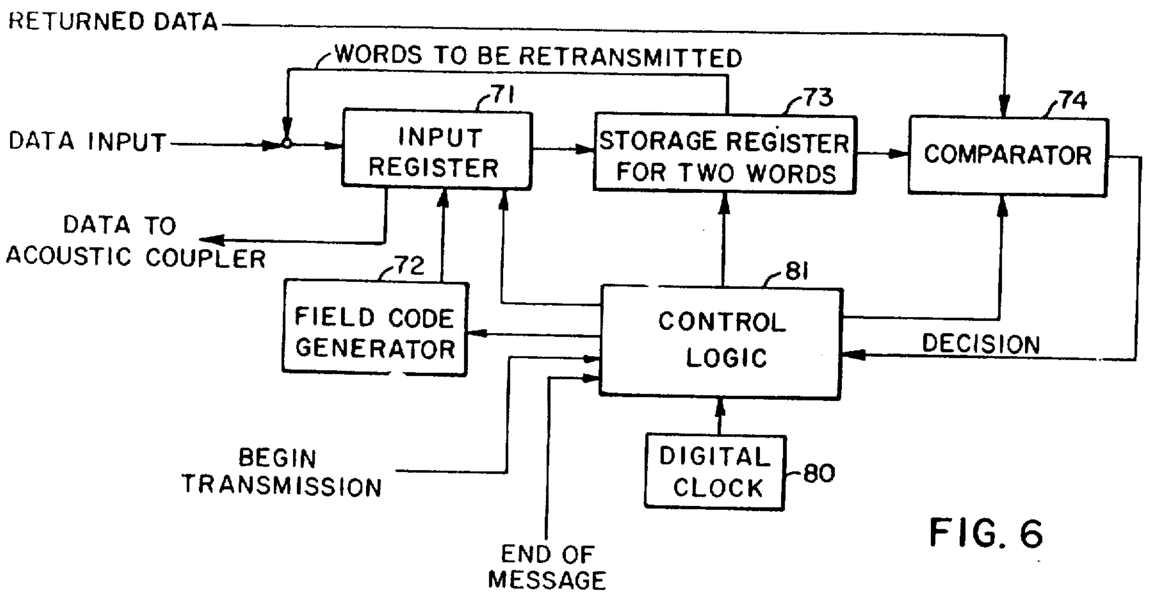
FIG. 6 is a functional block diagram of the data transmission system.

FIG. 6 is a functional block diagram of the transmit error control system. The illustrated system may be used as the transmit error control system of station A or of station B. From this diagram (FIG. 6) it can be seen that the transmission portion of the error control system receives four input signals. There is a begin transmission signal, an end of message signal, the data input signal, and the returned data signal for purposes of checking transmission errors.

The operation of the transmit error control system will be explained using as an example the transmission of data from station A to station B. The transmission of data in the reverse direction is identical except for the origin of the various signals to the error control system.

The transmit error control receives begin transmit, data input, and end of message signals from the data source, 11*a* of FIG. 1.

The transmission process begins when the data source sends the "begin transmit" signal to the error control transmitter along with the first word to be transmitted. The data is first stored in input register 71 (FIG. 6). A field code generator 72 generates the appropriate field code, in this case field code 1. This composite data word (data plus field code) is stored in a two-word storage register 73 and coupled to the acoustic coupler 13*a* (FIG. 1) for transmission. When the first word has been completely transmitted, the second word is taken from the data source 11*a* and loaded into input register 71. A field code of 2 is generated and combined with the second data word. The resulting word is stored in register 73 and then transmitted by the acoustic coupler 13*a* (FIG. 1). As the second word is being transmitted, the first data word and its associated field code are returned and compared by comparator 74 with the original word 1 stored in register 73. If comparison indicates that first word as returned is identical with this word as sent, word 3 will be loaded into input register 71, when word 2 has completed transmission, assigned field code 3 and stored in 73 and transmitted. As long as the comparisons by the comparator 74 indicates that no errors have been introduced, the process continues. The next word from the data source will be assigned field code 4, the next one field code 1, the next field code 2, etc. If an error is detected by comparator 74 between the returned word and the stored original word, a new word is not taken from the data source, 11*a*. Instead, the original word is transferred from register 73 to register 71 and retransmitted after which the second word stored in 73 will be transferred to register 71 and also retransmitted. If still received in error, the process will be repeated until the data words are correctly transmitted.

The control logic 81 generates control signals to assure that the various data transfers are performed as described above. The digital clock 80 provides a source of timing signals.

When all data words have been taken from the data source 11*a*, it sends an "End of Message" signal to the Error Control System transmitter. Transmission ceases after the last word transmitted has been returned and correctly compared.

Figure 7:
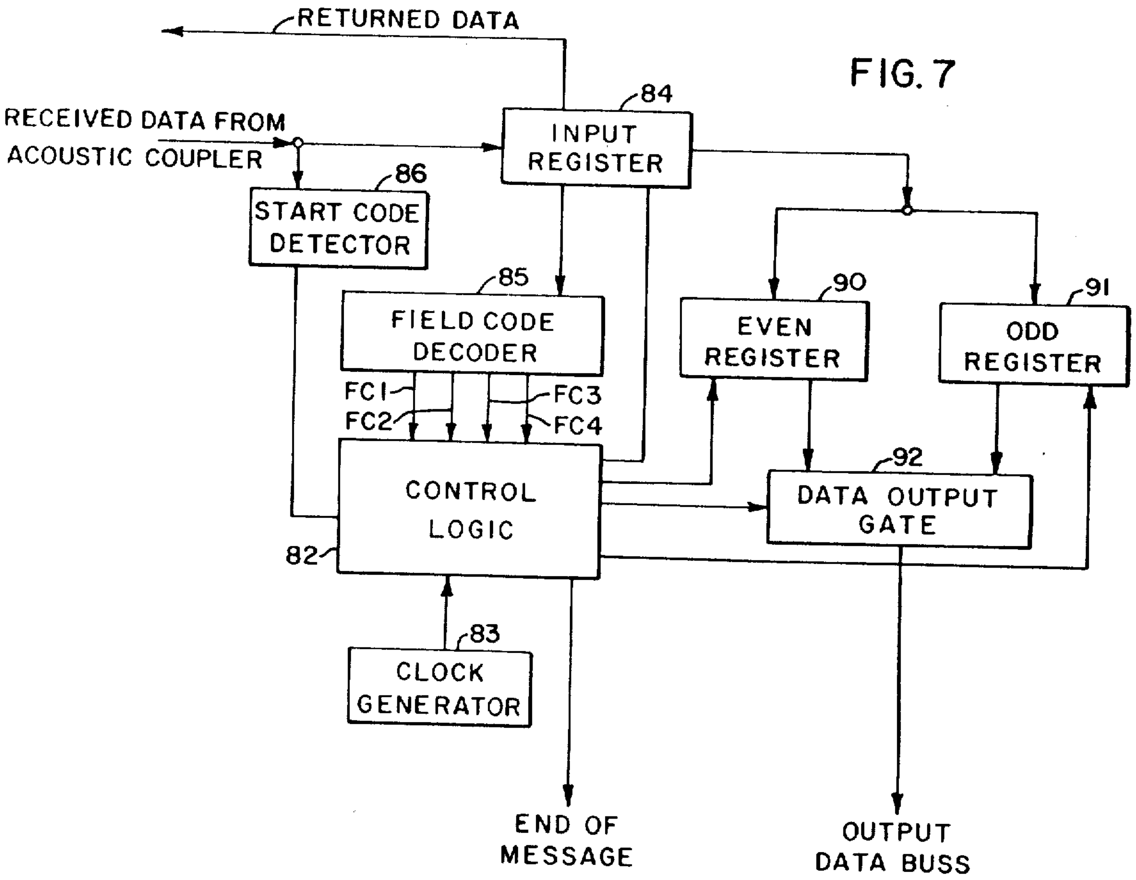
FIG. 7 is a functional block diagram of the receiver.

FIG. 7 is a functional block diagram of the receive error control system. The illustrated receive error control system is suitable for use at both station A and B. The data signal from the acoustic coupler is coupled to a start code detector 81 and to an input register 84. When a start code is detected, the control logic 82 couples clock pulses from a clock generator 83 to the input register 84. The clock pulses shift the bits of the data word into the input register 84. When a complete data word has been shifted into the input register 84, field code detector 85 examines the field code portion of the data word and generates signals indicative of the field code associated with the data word. The word stored in the input register 84 is then transferred to either the even or the odd register 90 or 91, depending on whether the field code is even or odd. The field codes labeled 1 and 3 in FIG. 5B are considered odd and codes 2 and 4 are even.

The field codes provide the means by which the receiver determines which words have been verified by the transmitter as correct. The field codes permit the receiver to make these decisions without the necessity of exchanging verifying signals between receiver and transmitter as in other systems.

Only received words with field codes 1 or 3 are stored in the Odd Register 91. Likewise, only received words with field codes 2 or 4 are stored in the Even Register 90.

Any received word with a legitimate field code is always stored in one of these two registers. The previous contents of that register into which a new word is stored is either destroyed or outputted as a good word when the new word is entered, depending upon field codes sequence of previously received words. For example, if a new word with field code 2 is received, and if a word having field code 2 were previously stored in the Even Register 90, this is an indication that the new word is a retransmission and, consequently, it replaces the old word in the Even Register 90. But if the contents of the Even Register had been a word with field code 4, that word would be outputted as a good word before the new word with a field code of 2 was stored. In brief, receiving a new word having an odd field code and in the expected field code sequences verifies the previously received and stored word having an odd field code. The previously received and stored words having an even field code are similarly verified. That is, receiving a word with a field code of 1 means the previously stored word with field code 3 is good. Receiving field code 3 means the previously stored word with field code 1 is good. Likewise, receiving a word having a field code of 2 indicates the stored word having a field code of 4 has been verified at the transmitter and is good.

The control logic 82 selects which of the words in these registers are to be coupled to the output data bus. The control logic 82 also generates an end of message signal to indicate when the message has ended. As the data is being shifted into the input register 84 it is also simultaneously shifted out as a return data signal (previously described) to station A so that this data can be compared to the signal as originally transmitted in order to detect transmission errors, as previously described.

Figure 8:
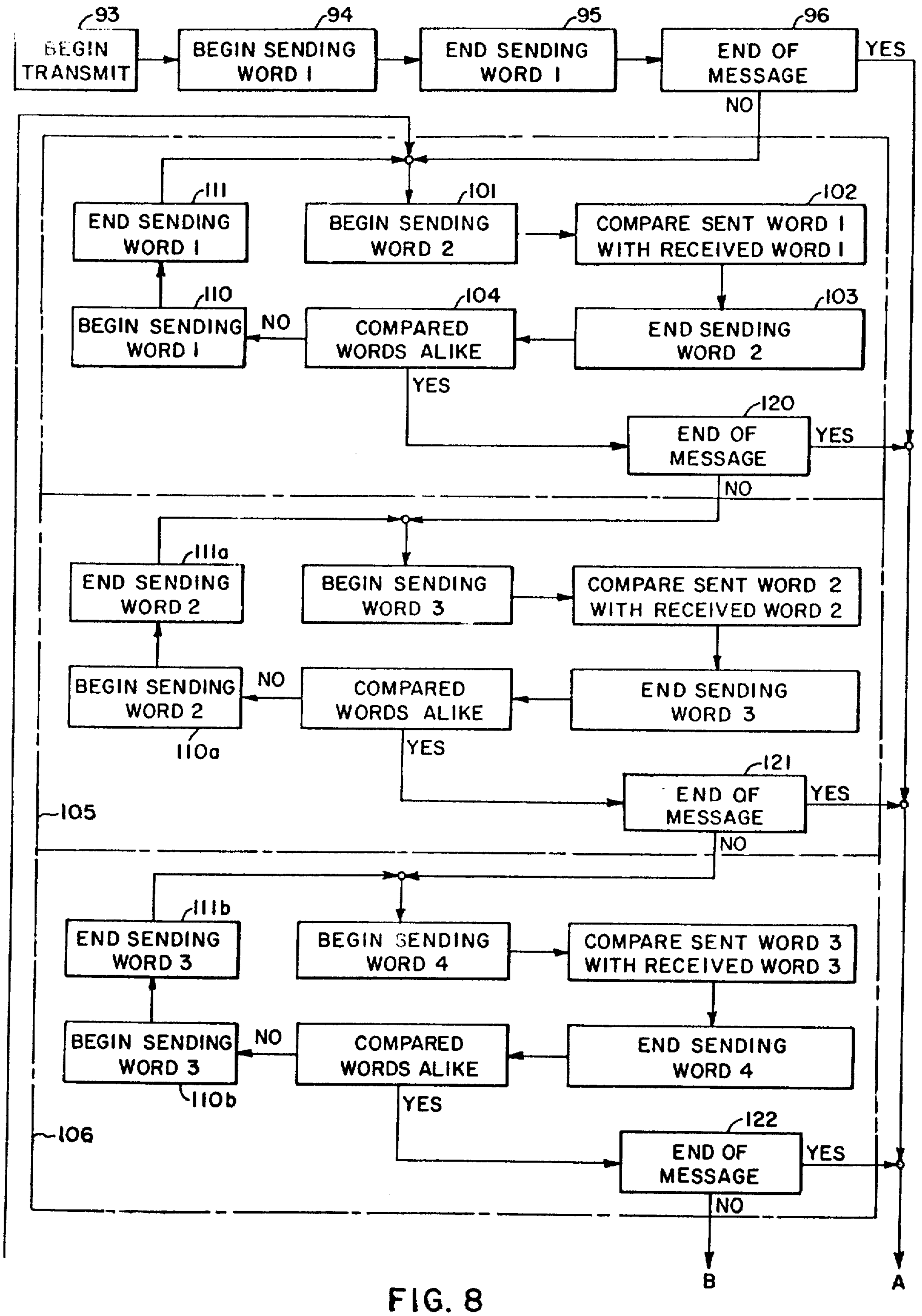
FIGS. 8A and 8B are flow charts which define the transmitting system.

FIG. 8 is a flow chart defining the detailed functional steps performed by the previously described system in transmitting data. The illustrated process is applicable to transmitting data in either direction.

The transmitting process begins with a "Begin Transmit" signal generated by the data source. The step of detecting this signal is illustrated functionally at reference numerals 93 of FIG. 8A.

The data source transfers the first word to be transmitted to the error-control transmitter. The transmission of this word is begun and completed as illustrated functionally at reference numerals 94 and 95.

After the transmission of the first word has ended it is necessary to determine if this is the end of the message. If only one word is to be transmitted, the data source will send an "End of Message" signal to the error-control transmitter after it has transferred that word. This step is shown functionally at reference numeral 96.

Assuming that no end of message signal is generated, the transmission of the second word will begin immediately following the transmission of the first word. During the transmission portions of the first and second words, the first word is returned from the receiver. The returned word will be compared with the first word as transmitted. This comparison must (in the preferred system as illustrated) be completed during the transmission of the second data word. When the comparison is completed, the decision (alike or not alike) is temporarily memorized. These steps are shown functionally as reference numerals 101 and 102 of FIG. 8A.

When the second word has been completely transmitted, the decision memory is inspected to determine whether or not errors were introduced in the first word by the transmitting channel, based on a comparison of the first word as transmitted to the first word as returned. These functional steps are shown at reference numerals 103 and 104. If the decision memory indicates the two words were alike, indicating word 1 was properly transmitted, a decision is made as to whether or not word 2 is the last word of the message. This step is illustrated at reference numeral 120. Assuming that the first word was properly transmitted and that word 2 was not the end of the message, the third word of the message will be transmitted in a manner identical to that used in transmitting the second word. The steps to complete transmission of the third word are enclosed by a dotted line and identified by reference numeral 105. Similarly the functional steps for transmitting words four and one are shown at reference numerals 106 and 107 of FIGS. 8A and 8B, assuming as the above explanation does, that no errors are made in transmitting the data. The above steps are repeated until an end of message signal is generated.

Returning now to the functional block diagram illustrated in FIG. 8A and to the step where the second word of the message is being transmitted (reference numeral 101), and assuming that the compare step illustrated at reference numeral 104 indicates that word one was not properly transmitted, the transmission cycle as previously described is changed in that words one and two are retransmitted. The process of retransmitting word one is indicated functionally at reference numerals 110 and 111. After the first word of the message has been retransmitted, the second word is retransmitted as illustrated at reference numeral 101, and the transmitting cycle proceeds in a normal manner as previously described. Similar steps for retransmitting words with a field code of 2, 3 and 4 corresponding to the second, third and fourth words are respectively illustrated at reference numerals 110*a*–110*c* and 111*a*–111*c*. This cycle is repeated for all subsequent words of the message.

Figure 8B:
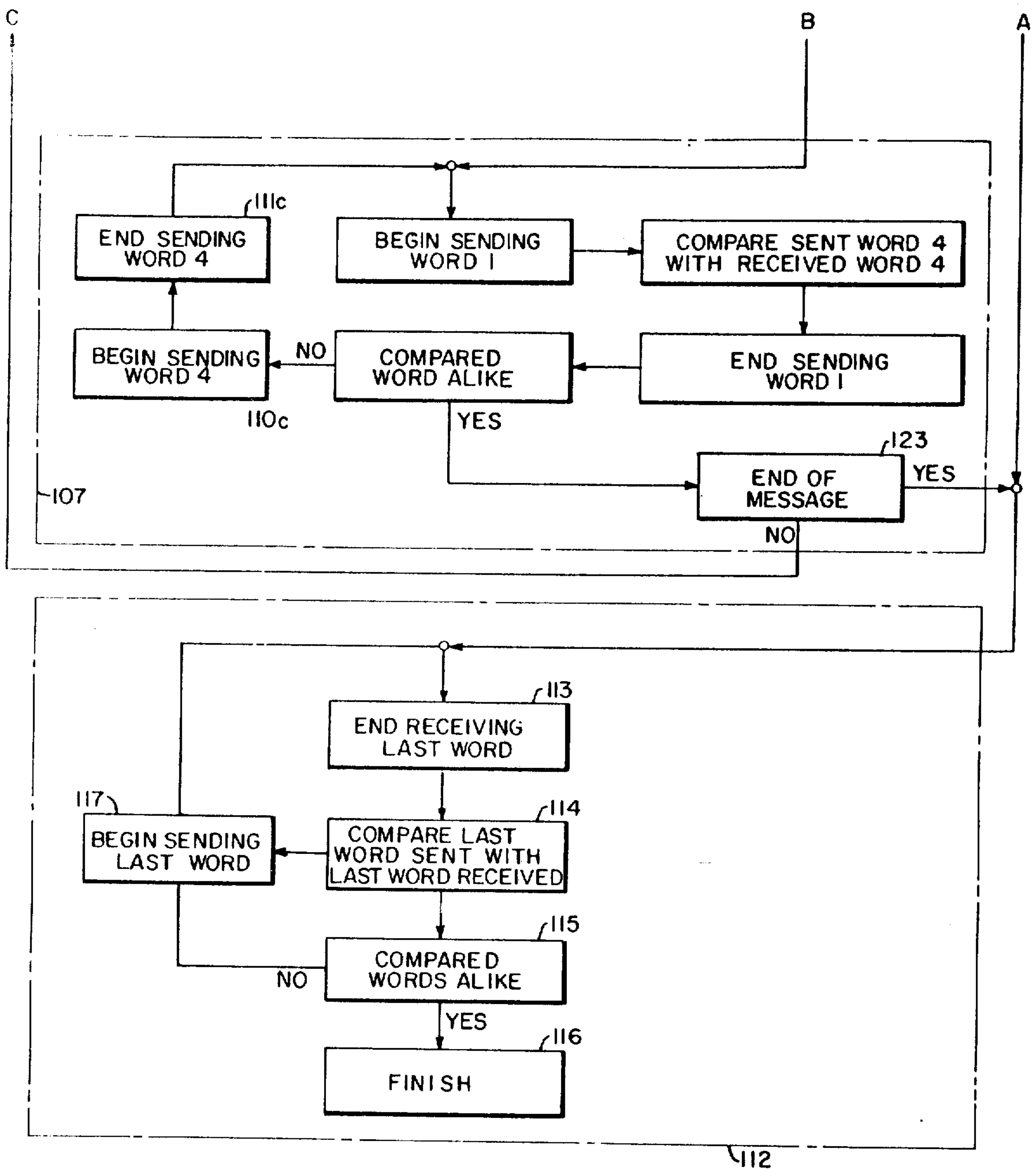

Assuming now that the message to be transmitted contains only one word, an end of message signal generated by the data source following the transfer of word 1 to the error-control transmitter and illustrated functionally at reference numeral 96, causes the sequence to transfer to the last word routine illustrated functionally at reference numeral 112 of FIG. 8B after the transmission of word 1 is completed. This end of message signal may be a digital word transmitted in the normal manner but having a special code. It may also be a special digital signal which is independent of the data signal generated by the data source. The first step of this routine, after word 1 has been returned to the transmitter, is to compare the word one as transmitted with the word one as received. If the word transmitted is identical to the one received, the transmission of the single word message is finished. These steps are illustrated functionally at reference numerals 113 to 116. Conversely, if the word transmitted is not identical to the word received, word 1 is retransmitted and the comparison repeated. This process is repeated until the comparison indicates that the last word of the message was properly transmitted. The functional steps of the last word routine are illustrated at reference numerals 113 through 117 of FIG. 8B. A similar end of message signal is generated when either word with field codes of two, three, four or one is the last word of the message. The functional steps illustrating these signals are shown at reference numerals 120–123 of FIGS. 8A and 8B.

The last word routine, illustrated at reference numeral 112, is always executed following the transmission of the last word of the message. It is to be noted that the last word routine illustrated at reference numeral 112 is only one example of a means of ending the transmitting cycle. For example, the transmitter could transmit words indicating End of Message after the last word transmitted was determined to be correct.

Figure 9A:
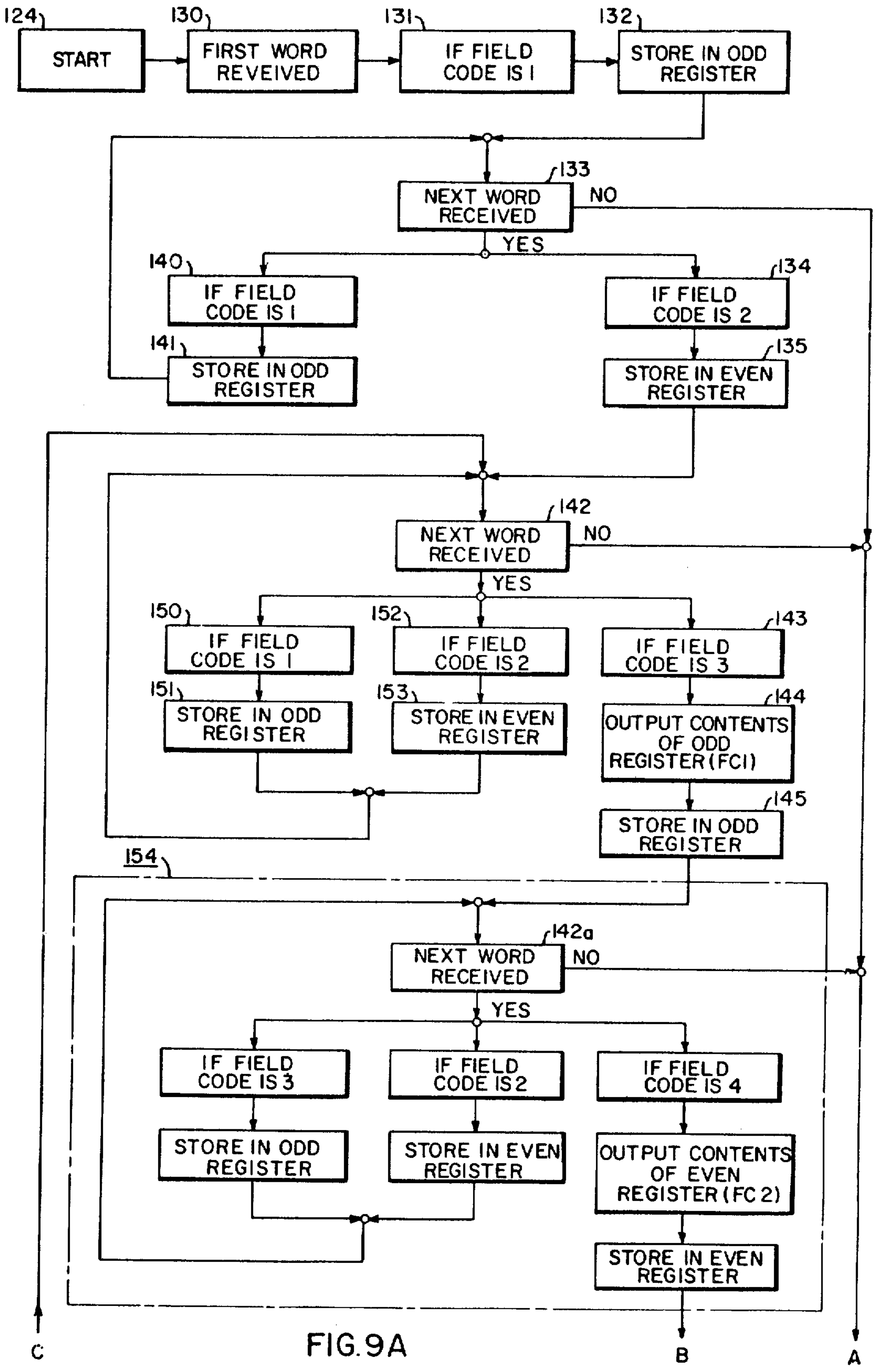
FIGS. 9A and 9B are flow charts which define the receiving system.
Figure 9B:
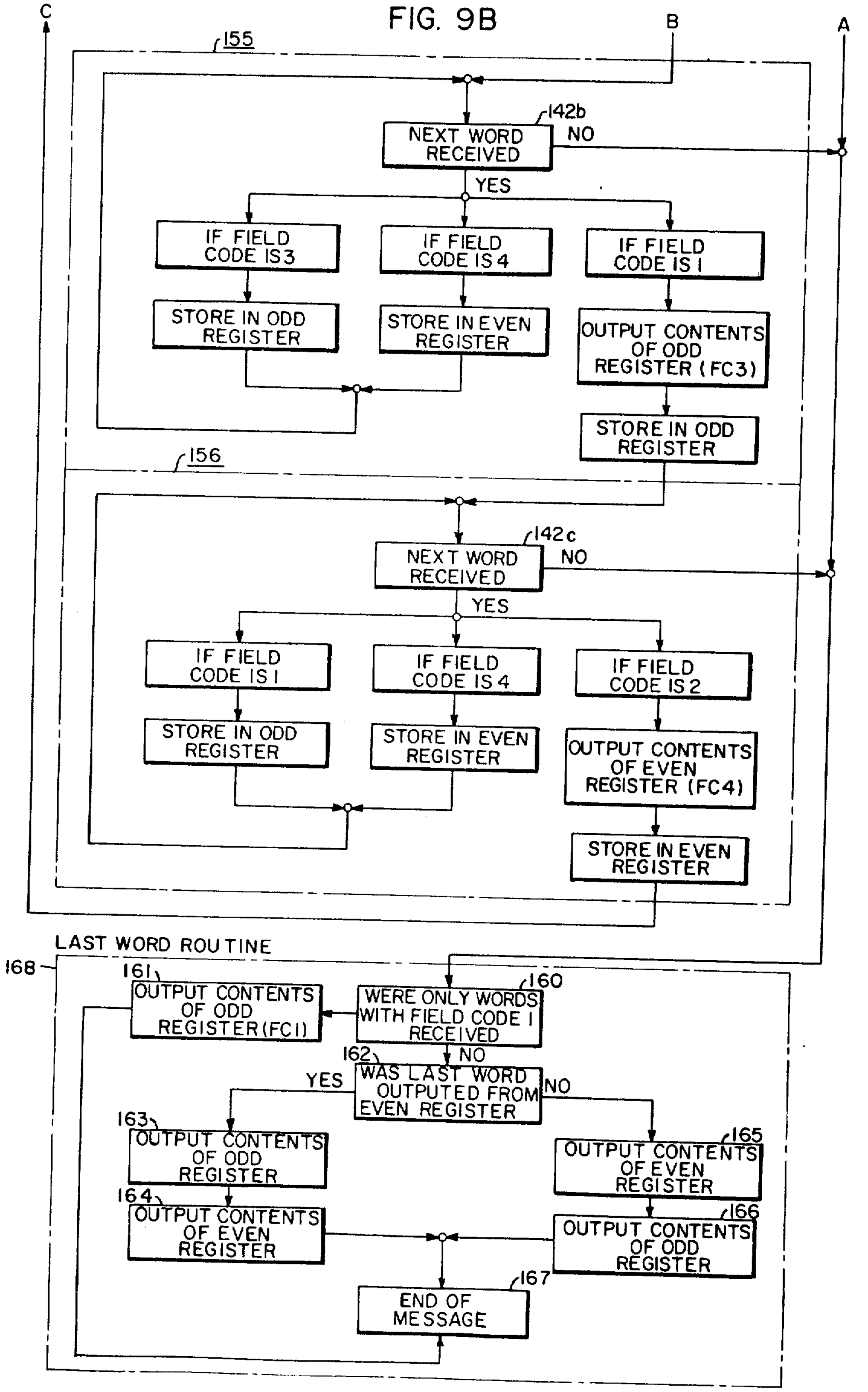

FIGS. 9A and 9B are functional block diagrams of the error-correction system used in the receiver. A start signal is generated by detecting the first time when the output signal of the acoustic couplers changes from a high to a low valve. A functional block diagram for detecting the start signal is shown at reference numeral 124 of FIG. 9A.

After the start signal has been detected, the first word of the message, provided its field code is one, is stored in the odd register. These steps are functionally shown at reference numerals 130, 131 and 132. After the first word with a field code of one has been stored in the odd register, the next word is received and stored in the even register if it has a field code of two. These functional steps are shown at reference numerals 133, 134 and 135 of FIG. 9A. If instead, the field code of the second word received was a one, that word would be stored in the odd data register. These functional steps are shown at reference numeral 140 and 141, and are only executed when an error is detected in transmission of a message containing only one word. If the word in a message of only one word is not transmitted accurately the second time, the process proceeds through the functional block steps indicated at reference numerals 140 and 141 for a second time. This procedure continues until the single word message is accurately received, indicated by no subsequent words being received. This step is functionally illustrated at reference numeral 133.

Conversely, if the second word transmitted has a field code of two, indicating the message contains more than one word, that word is stored in the even register as indicated functionally at reference numerals 134 and 135. If the transmission of the third word begins with a predetermined period of time, which is functionally checked by a step identified at reference numerals 142, one of three processes will occur, depending upon the field code of the third word received.

Assuming that the field code of the third word is three, indicating that the previously transmitted word with a field code of one was correctly transmitted, the content of the odd register (which contains a word with field code 1) will be coupled to the output data bus as a data signal and the new data word with the field code three will be stored in the odd register. These steps are shown illustrated functionally at reference numerals 143, 144 and 145 of FIG. 9A.

If the field code of the next word received illustrated functionally at step 142 was one, indicating that the previously transmitted data word with this field code was incorrectively transmitted, this word will be stored in the odd register to await verification by the transmitter comparator. These steps are shown functionally at reference numerals 150 and 151.

Assuming the next word received illustrated at step 142 had a field code of one, indicating that an error had been made in the transmission of word one and that words having field codes of one and two are being repeated, the next word received will have a field code of two and will be stored in the even register. These steps are shown functionally at reference numerals 152 and 153.

If word 1 is again transmitted in error, words with field codes 1 and 2 will again be retransmitted, received, and stored as explained previously. The process continues until the transmitter verifies that word 1 was correctly transmitted. Then, following the transmission of words having field codes of 1 and 2, a word with field code 3 is transmitted and received. The contents of the odd register will be outputted and the new word stored in the odd register as shown functionally by functional block 143, 144 and 145 as previously described.

The reception of a word with a field code of three always indicates that a stored data word with a field code of one has been properly transmitted and can be outputted as data correctly received. This is true because a word with field code three will not be transmitted until after the previous word with field code one has been returned to the transmitter and found to be free of errors.

This completes the process for all conditions whereby the receiver senses that the word it has received with field code one has been correctly transmitted. It then outputs that word as good data. It also stores words with field codes two and three while they are being tested by the transmitter. The subsequent data words having field code two, three and four are similarly checked for accuracy and outputted as good data with the functional steps of verifying and outputting these words illustrated within the dotted lines 154, 155 and 156. Following completion of the steps illustrated functionally at reference numeral 156, the sequence returns to the functional step illustrated at reference 142 and the receiving process continues until all words of the message have been received.

Steps to detect the last word of the message are functionally illustrated blocks 133, 142 and 142*a* through 142*c*. When it is determined that there are not additional words to be received, the words stored in the odd or even memories are outputted by a last word routine illustrated functionally by reference numeral 168. The first step in the last word routine is to determine if the message consisted of only one word. The functional step to perform this decision is indicated at reference numeral 160. If only words with a field code of one were received, then the message contained only one word, and the contents of the odd register is outputted and the receive cycle is completed. These functional steps are illustrated at reference numerals 160, 161 and 167. Conversely, if the message contained more than one word, two words must be outputted. Under these conditions it is necessary to determine from which memory the last word was outputted and then output the contents of the other memory first. The functional steps to perform this are illustrated at reference numerals 162 through 166. When the contents of both memories have been outputted, the receive cycle ends as illustrated functionally at reference numeral 167.

The last word of the message can be detected by assuming that the message has ended if no data words are received within a predetermined time. It is to be noted that other methods of sensing a last word could also be used, for example, a special word to indicate "End of Message" could be sent by the transmitter and detected by the receiver.

The test system illustrated in FIG. 2 utilizes the above-described transmission and error correction system to interface the computer facility 20 with the portable test set 21. The resulting test system permits the portable test set 21 to be truly portable. In fact, the portable test set 21 may be packaged in a brief case type package, as illustrated in FIG. 2.

The capability of the computer facility 20 communicating with the portable test set 21 via a conventional telephone network also extends the advantages of sophisticated computer controlled testing to remote locations not justifying a permanent installation of such equipment. These features make a flexible, high performance, and portable computer controlled test set feasible.

We claim:

1. A test system, comprising in combination:

a. a computer facility comprising means for generating a series of digital data words, said words specifying predetermined input signals to be used to test remotely positioned equipment and means for analyzing sample signals indicative of the response of said equipment to said predetermined input signals;

b. a test set comprising (1) means for receiving said digital data words and for generating in response thereto said predetermined input signals, (2) means for coupling said predetermined input signals to said remotely positioned equipment, (3) means for sampling signals produced by said equipment in response to said predetermined input signals to generate said sample signals; and c. communication apparatus comprising first and second stations coupling said computer and said test set via a full duplex channel, said first station being positioned at said computer and said second station being positioned at said test set, each of said stations including error correction means comprising:

1. a field code generator for generating and assigning a sequential field code to each of said digital data words at the point where said digital data words originate to form a data signal:
2. start code detector and temporary storage circuitry to detect when a data signal originating at the other station is being received and for storing a predetermined number of said data words and their associated field code;
3. data retransmitting means for transmitting the received digital data signal to the originating station;

4. compare means for comparing the retransmitted digital data signal to the original digital data signal on a bit by bit basis with any difference between these signals indicating a transmission error;
5. means for retransmitting any digital data signal found to contain errors without interrupting the data stream from the transmitting to the receiving station; and
6. means for checking the sequence of the field codes associated with each of said data words as they are received by the receiving station to determine if the associated data word is being retransmitted because of transmission errors and for outputting data words from said temporary storage when the stored data word has been verified as correct by checking the sequence of field codes arriving at said stations.

2. A test system in accordance with claim 1 wherein said communication apparatus includes first and second modems interconnected by a telephone network.

3. A test system, comprising in combination:

a. a computer facility comprising first means for generating a first series of digital data words specifying predetermined signals to be used to test remotely positioned equipment and second means for receiving and analyzing digital test words indicative of the response of said remotely positioned equipment to said predetermined input signals and for analyzing said digital test signals to generate digital status words indicative of the operational status of said remotely positioned equipment;

b. a test set comprising means for receiving said first series of digital data words and for generating in response thereto said predetermined input signals, and means for sampling signals produced by said remotely positioned equipment in response to said predetermined input signals to generate said digital test signals; and c. communication apparatus coupling said computer facility to said test set via a full duplex channel comprising first and second stations respectively positioned at said computer facility and at said test set each of said stations including, (1) a field code generator for generating and attaching a field code to said first digital data words, said digital test words, and said digital status words prior to their transmission, (2) retransmitting means for retransmitting all received digital words and their attached field code to the transmitting station where they are compared by comparator means on a bit by bit basis with the original to detect transmission errors, (3) means for correcting any errors detected by retransmitting the original data word and its associated field code, (4) temporary storage and field code detection means for storing each received digital word for a time period sufficient to determine that the word is not being retransmitted to correct transmission errors with the determination being made that a particular word is not being retransmitted to correct transmission errors being made by utilizing said field code detecting means to examine the sequence of subsequently arriving field codes with these codes being in the normal sequence indicating that said particular word was transmitted free of errors.

4. A test system, comprising in combination:

a. a computer facility for generating a series of digital data words, said digital data words specifying predetermined input signals to be used to test remotely positioned equipment and for analyzing sample signals indicative of the response of said equipment to said predetermined input signals to generate diagnostic signals indicative of functional status of said remotely positioned equipment;

b. a test set comprising (1) means for receiving said digital data words and for generating in response thereto said predetermined input signals, (2) means for coupling said predetermined input signals to said remotely positioned equipment, (3) means for sampling signals produced by said remotely positioned equipment in response to said predetermined input signals to generate said sample signals, (4) means for transmitting said sample signals to said computer facility, (5) means for retransmitting said digital data words and said diagnostic signals to communication apparatus located at said computer facility via a full duplex channel, (6) access means for providing external access to said diagnostic signals, and c. communication apparatus located at said computer facility for coupling said computer facility to said test set via said full duplex channel, said apparatus including error detection means with transmission errors being detected by comparing the retransmitted digital data words and the retransmitted diagnostic signals on a bit by bit basis to the corresponding digital data words and the corresponding diagnostic signals as originally transmitted with errors being corrected by retransmitting any digital data words or diagnostic signal containing errors without interrupting the continuity of the transmission with the retransmission of any words to correct errors being detected at the receiver located at said test set by examining the sequence of field codes attached to the data words as they arrive at the said receiver, said field codes having been assigned to said digital data words and said diagnostic signals when they were originally transmitted.

* * * * *